United States Patent
Ho et al.

(10) Patent No.: US 10,832,101 B2
(45) Date of Patent: Nov. 10, 2020

(54) ELECTRONIC CARD HOLDERS

(71) Applicant: HEWLETT-PACKARD DEVELOPMENT COMPANY, L.P., Houston, TX (US)

(72) Inventors: Hsin-Tsung Ho, Taipei (TW); Chia-Ming Tsai, Taipei (TW); Keng-Ming Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,894

(22) PCT Filed: Jul. 29, 2016

(86) PCT No.: PCT/US2016/044773
§ 371 (c)(1),
(2) Date: Oct. 11, 2018

(87) PCT Pub. No.: WO2018/022096
PCT Pub. Date: Feb. 1, 2018

(65) Prior Publication Data
US 2019/0205709 A1    Jul. 4, 2019

(51) Int. Cl.
*G06K 13/08*    (2006.01)
*H01R 12/51*    (2011.01)
(Continued)

(52) U.S. Cl.
CPC ......... *G06K 13/085* (2013.01); *G06K 7/0021* (2013.01); *G06K 13/0825* (2013.01);
(Continued)

(58) Field of Classification Search
None
See application file for complete search history.

(56) References Cited

U.S. PATENT DOCUMENTS 5,091,898 A * 2/1992 Bessho ............... G11B 17/043
360/99.06
5,155,663 A * 10/1992 Harase ............ G06K 19/07732
273/148 B
(Continued)

FOREIGN PATENT DOCUMENTS

| RU | 2175210 C2 | 10/2001 |
| RU | 63979 U1 | 6/2007 |
| RU | 132230 U1 | 9/2013 |

OTHER PUBLICATIONS

How to Remove the SD Card, Express Card, Smart Card and PCMCIA Card on a Dell Latitude E6510 System, < http://www.dell.com/support/article/us/en/04/SLN296181#Three>.

*Primary Examiner* — Xanthia C Cunningham
(74) *Attorney, Agent, or Firm* — Lakshmi Kumaran & Sridharan

(57) ABSTRACT

The present subject matter describes an electronic card holder. In an example implementation, the electronic card holder includes a housing having a slot to receive an electronic card. A slidable frame in the housing is to hold the electronic card. The slidable frame has a stud fittable in a groove in the housing. The card holder includes a resilient element with one end being coupled to the housing and other end being coupled to the slidable frame. The card holder further includes an actuating member coupled to the groove. When the electronic card is pushed inside the housing, the slidable frame is moved to lock the stud inside the groove and compress the resilient element. When the actuating member is pushed, the stud is released from the groove and the resilient element is relaxed to move the slidable frame such that the electronic card is pushed out of the housing.

10 Claims, 3 Drawing Sheets

(51) Int. Cl.
*G06K 7/00* (2006.01)
*H01R 12/70* (2011.01)
*H01R 13/635* (2006.01)

(52) U.S. Cl.
CPC ......... *H01R 12/51* (2013.01); *H01R 12/7005* (2013.01); *H01R 13/635* (2013.01)

(56) References Cited

U.S. PATENT DOCUMENTS

| | | | | |
|---|---|---|---|---|
| 5,473,505 A * | 12/1995 | Kessoku | ............... | G06K 7/0021 361/679.32 |
| 5,674,080 A | 10/1997 | Takemura | | |
| 5,812,370 A * | 9/1998 | Moore | ............... | G11B 33/121 361/679.35 |
| 5,889,649 A * | 3/1999 | Nabetani | ............... | G06K 7/0082 361/679.32 |
| 6,234,821 B1 * | 5/2001 | Tan | ............... | H01R 12/7005 439/328 |
| 6,264,506 B1 * | 7/2001 | Yasufuku | ............... | G06K 7/0021 439/638 |
| 6,270,365 B1 * | 8/2001 | Nishioka | ............... | G06K 13/08 439/159 |
| 6,375,479 B1 * | 4/2002 | Johnson | ............... | H01R 24/62 439/131 |
| 6,377,451 B1 * | 4/2002 | Furuya | ............... | G06F 1/1616 360/99.02 |
| 6,382,995 B1 | 5/2002 | Bricaud et al. | | |
| 6,460,772 B1 | 10/2002 | Stahl | | |
| 6,510,051 B2 * | 1/2003 | Kim | ............... | G06F 1/1632 312/223.2 |
| 6,587,348 B2 * | 7/2003 | Kondo | ............... | G06K 7/0047 361/728 |
| 6,776,640 B2 * | 8/2004 | Nishioka | ............... | G06K 13/08 439/159 |
| 6,893,268 B1 * | 5/2005 | Harari | ............... | G06F 13/4068 361/679.37 |
| 6,947,290 B2 * | 9/2005 | Hirata | ............... | G06K 7/0013 361/741 |
| 7,133,296 B2 * | 11/2006 | Choi | ............... | H01R 13/641 361/798 |
| 7,239,593 B2 * | 7/2007 | Abe | ............... | G11B 33/08 360/137 |
| 7,309,016 B2 | 12/2007 | Lev et al. | | |
| 7,843,698 B2 * | 11/2010 | Takizawa | ............... | G06F 1/181 361/732 |
| 8,010,974 B2 * | 8/2011 | Iwaasa | ............... | G11B 33/027 360/99.02 |
| 8,070,522 B2 * | 12/2011 | Shtargot | ............... | H05K 7/1492 439/638 |
| 8,164,908 B2 * | 4/2012 | Tamura | ............... | G06F 1/185 361/728 |
| 8,432,701 B2 * | 4/2013 | Katano | ............... | A47B 67/04 361/732 |
| 8,498,123 B2 * | 7/2013 | Kawada | ............... | G06F 1/1635 360/99.02 |
| 8,873,229 B2 * | 10/2014 | Yang | ............... | H05K 5/0217 361/679.31 |
| 8,902,602 B2 * | 12/2014 | Wang | ............... | H05K 7/1461 361/737 |
| 9,019,711 B2 * | 4/2015 | Tamura | ............... | H01R 12/71 361/752 |
| 9,134,772 B2 * | 9/2015 | Zhang | ............... | G06F 1/187 |
| 9,820,404 B1 * | 11/2017 | Wu | ............... | H05K 7/1427 |
| 10,076,051 B2 * | 9/2018 | Honda | ............... | H05K 7/1417 |
| 2002/0027769 A1 * | 3/2002 | Kasahara | ............... | G06F 1/1616 361/679.31 |
| 2002/0141147 A1 | 10/2002 | Ando | | |
| 2005/0052836 A1 | 3/2005 | Bhogal | | |
| 2010/0136811 A1 | 6/2010 | Takao | | |

\* cited by examiner

ELECTRONIC CARD HOLDERS

BACKGROUND

Electronic cards, such as smart cards, memory cards, and access control cards can store information. The information stored in electronic cards may be read by an electronic device, such as a personal computer, a laptop or a card reading device, such as a USB card reader.

BRIEF DESCRIPTION OF DRAWINGS

The following detailed description references the drawings, wherein.

DETAILED DESCRIPTION

Figure 1:
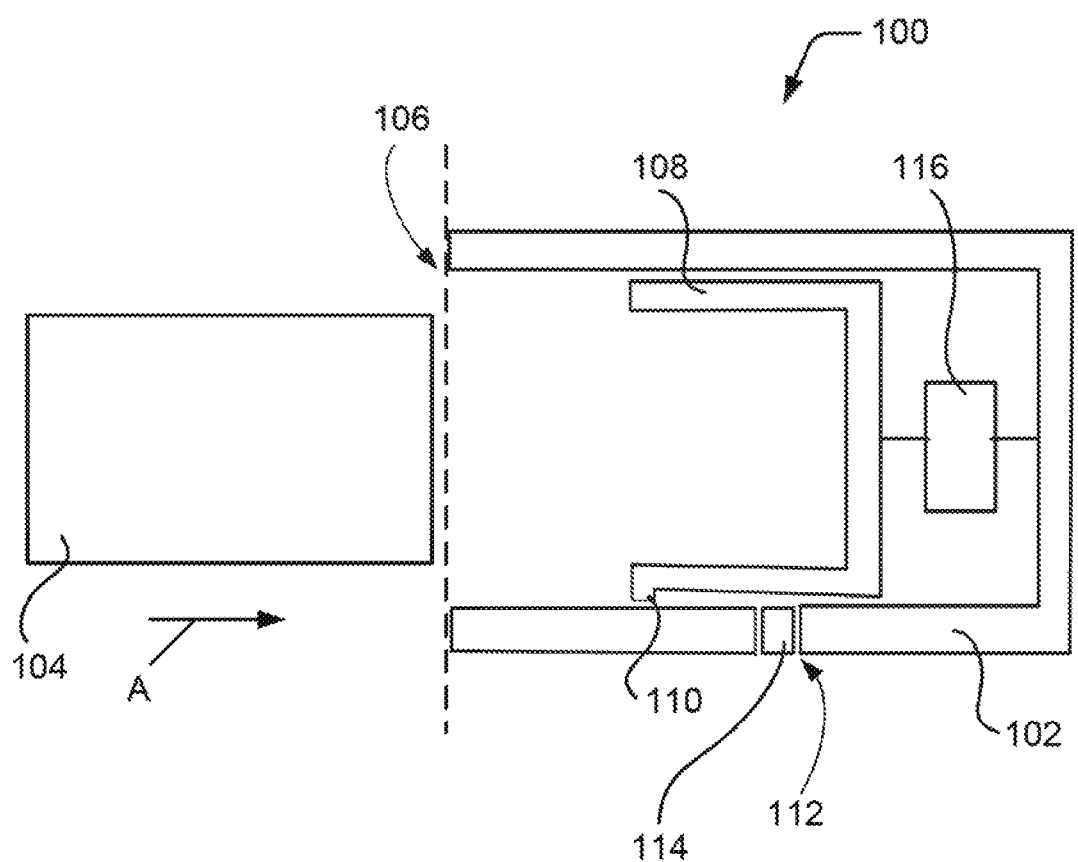
FIG. 1 illustrates an electronic card holder, according to an example implementation of the present subject matter.

An electronic card may be a plastic card having one or a combination of a barcode, a magnetic strip, and an integrated circuit (IC) embedded in the plastic card. Examples of the electronic card may include a smart card also referred to as a chip card or an IC card, a memory card, a personal computer memory card international association (PCMCIA) card, or the like. The electronic card, hereinafter referred to as the card, may be read by an electronic device having the capability to read information stored in the card. Examples of such electronic devices include a desktop computer, a laptop, a personal digital assistant (PDA), and a USB card reader. The electronic device may include a card holder. The card may be inserted in the card holder which may lock the card in the electronic device and a card reader in the electronic device may decode the information stored in the card.

For the card reader to operate, the card may be retained at a desired position inside the card holder by use of a locking mechanism. The card holder, generally, includes a housing with a slot. When the card is inserted through the slot and pushed into the housing, the locking mechanism may operate to latch the card and thus retain the card in the desired position. In this position, generally the card remains partly inside the housing and partly outside with an end of the card projecting out of the housing. To withdraw the card from the card holder, the projecting end of the card may be pushed in to release the lock which moves the card outwards, so that the card may be pulled out of the card holder.

With this locking mechanism, when the card remains latched inside the housing, a portion of the card overhangs or protrudes out of the housing. This protruding portion of the card may obstruct free movement of the electronic device. For example, when the electronic device, say a laptop, having the card inserted in the slot, is to be moved, the protruding portion of the card may get accidentally pushed thereby releasing the card from the card holder and the card reader may no longer be able to read the card. Also, an accidental knock or bump to the protruding portion of the card may shift the card from the desired position and the card may be unreadable to the card reader or may damage the card or the card reader.

Further, with the above locking mechanism, to remove the card from the card holder, the projecting end of the card is to be pushed. With thin electronic cards like smart cards, which may include, credit cards, ATM cards, fuel cards, access control cards, and public transport payment cards, when a thin edge of the card is pushed, the card may bend and the latch may not be released. Thus, to withdraw the card from the card holder, the thin edge of the card may have to be pushed for multiple times. This may damage the locking mechanism as well as the card.

The present subject matter describes electronic card holders and electronic devices having such card holders. The electronic card holders of the present subject matter, also referred to as card holders, may eliminate the risk of accidentally deflecting or removing the card from the card holder. Further, the card holders of the present subject matter may reduce the risk of damage to the locking mechanism and/or the card while removing the card from the card holder and may also reduce the complexity in the locking mechanism.

In accordance with an example implementation of the present subject matter, the electronic card holder includes a housing. The housing is provided with a slot or an aperture to receive an electronic card. The housing includes a slidable frame positioned in a cavity within the housing. The electronic card may be inserted through the slot into the cavity where the slidable frame holds the electronic card. The slidable frame has a stud which can fit in a corresponding groove in the housing. The card holder includes an actuating member coupled to the groove. The card holder also includes a resilient element having one end coupled to the housing and other end coupled to the slidable frame. When the electronic card is pushed inside the housing, the slidable frame is moved inwards to compress the resilient element and lock the stud inside the groove. When the stud gets locked inside the groove, the electronic card is maintained completely inside the housing. To remove the electronic card from the housing, the actuating member may be pushed. The stud is, thus, released from the groove and the resilient element is relaxed to move the slidable frame so that the electronic card is pushed out of the housing. The electronic card may then be gripped and removed from the card holder.

With the card holders of the present subject matter, when the card is inserted in the card holder, the entire card is held within the housing. This enables an electronic device having the card holder of the present subject matter to be moved freely while the card is inserted in the card holder. Also, the card holders of the present subject matter may hold the card in a desired position within the housing which may facilitate the card reader of the electronic device to operate without any interruption even when the electronic device is moved.

Further, the card holders of the present subject matter use the actuating member to release the card from the housing. Thus, to remove the card from the housing, the actuating member is pushed instead of the card itself as with other card holders. This may reduce chances of damage to the card and the card reader. Also, the card holders of the present subject matter use a simple mechanism which may be easily assembled and manufactured and may be used in a variety of electronic devices.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates an electronic card holder 100, according to an example implementation of the present subject matter. The electronic card holder 100 may also be referred to as a card holder 100. In an example implementation, the card holder 100 may be integral to an electronic device, such as a desktop, a laptop, a PDA, an USB card reader device, or the like, which has a capability to read an electronic card.

The card holder 100 includes a housing 102. The housing 102 may function as an enclosure or a casing for an electronic card 104. The housing 102 has a slot 106. The slot 106 may be an opening or a slit at one end of the housing 102 through which the electronic card 104 may be pushed, in a direction as depicted by arrow A, to move into the housing 102. The card holder 100 includes a slidable frame 108 positioned in the housing 102. The slidable frame 108 operates to hold the electronic card 104 in the housing 102. The slidable frame 108 has a stud 110. The stud 110 may be a protrusion having a profile complementary to a profile of a groove 112 in the housing 102, so that the stud 110 can fit in the groove 112. The slidable frame 108 may move within the housing 102 to lock the stud 110 in the groove 112. An actuating member 114 is coupled to the groove 112. The actuating member 114 may be pushed to release the stud 110 from the groove 112.

The card holder 100 also includes a resilient element 116. In an example, the resilient element 116 may be a mechanical spring. One end of the resilient element 116 is coupled to the housing 102 and other end of the resilient element 116 is coupled to the slidable frame 108. The slidable frame 108 may move inside the housing 102 to compress or relax the resilient element 116. In an example implementation, the housing 102, the slidable frame 108, and the actuating member 114 may be formed from plastic and the resilient element 116 may be formed from metal.

Figure 2A:
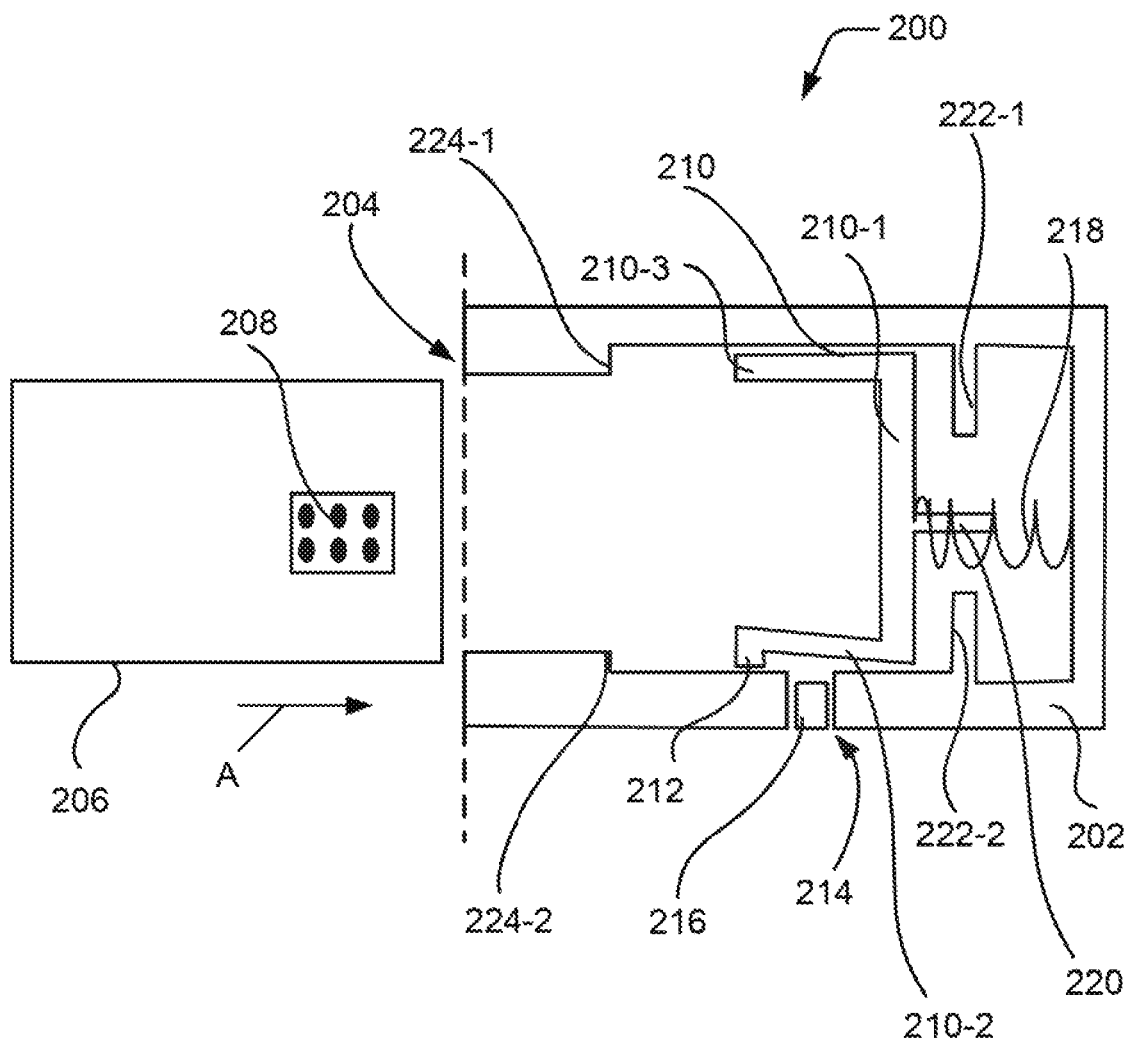
FIGS. 2a and 2b illustrate a plan view of an electronic card holder, according to an example implementation of the present subject matter.
Figure 2B:
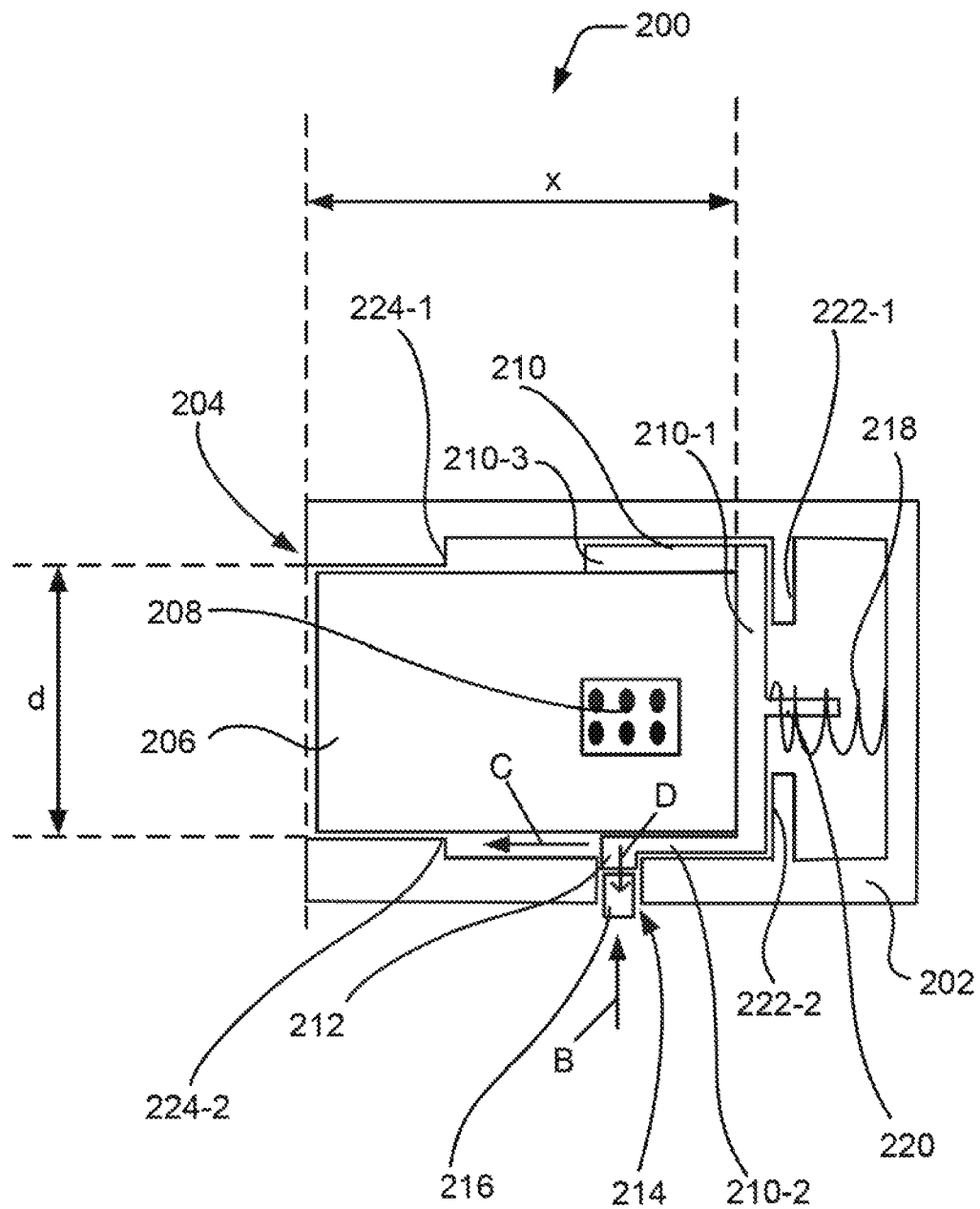

FIGS. 2a and 2b illustrate a plan view of an electronic card holder 200, according to an example implementation of the present subject matter. The electronic card holder 200, also referred to as a card holder 200, includes a housing 202. The housing 202 has a slot 204 at an end of the housing 202. The slot 204 operates as a passage for entry or exit of an electronic card 206, also referred to as a card 206, in the housing 202. The card 206 may pass through the slot 204 which guides the card 206 to a cavity inside the housing 202. The cavity may refer to a maximum enclosed volume of the housing 202.

FIGS. 2a and 2b show a connector 208 embedded in the electronic card 206. In an example, the connector 208 may be an integrated circuit (IC) chip or a metal contact pad which may couple with a card reader (not shown) when the card 206 is locked in the card holder 200.

A slidable frame 210 is positioned in the cavity of the housing 202. The slidable frame 210 holds the card 206 in the housing 202. In an example implementation, the card 206 may snug fit in the slidable frame 210. The slidable frame 210 has a base member 210-1 positioned along a length of the slot 204, as shown in FIGS. 2a and 2b. The slidable frame 210 includes two side arms, each at an end of the base member 210-1 and perpendicular to the base member 210-1. As shown in FIGS. 2a and 2b, a first side arm 210-2 is positioned at one end of the base member 210-1 and a second side arm 210-3 is positioned at other end of the base member 210-1. When the electronic card 206 is pushed in the housing 202, the card 206 may be held by the slidable frame 210 on the base member 210-1 and between the two side arms, viz., the first side arm 210-2 and the second side arm 210-3.

A stud 212 is placed on the slidable frame 210. In an example implementation, the stud 212 may be a protrusion integral to the slidable frame 210. The stud 212 may be positioned on one of the two side arms of the slidable frame 210. As shown in FIGS. 2a and 2b, the stud 212 is positioned on the first side arm 210-2. Alternatively, in an example implementation, the stud 212 may be positioned on the second side arm 210-3.

The housing 202 has a groove 214 to receive the stud 212. The groove 214 may have a profile complementary to a profile of the stud 212 so that the stud 212 may be fitted in the groove 214. The card holder 200 includes an actuating member coupled to the groove 214. In an example implementation, the actuating member may be a push button 216, as shown in FIGS. 2a and 2b. The card holder 200 further includes a resilient element coupled to the housing 202 and the slidable frame 210. In an example implementation, the resilient element may be a spring 218 as shown in FIGS. 2a and 2b. One end of the spring 218 may be coupled to the housing 202 and other end of the spring 218 may be coupled to the slidable frame 210. As shown in FIGS. 2a and 2b, the base member 210-1 of the slidable frame 210 has a connecting rod 220 passing through the other end of the spring 218. The connecting rod 220 couples the spring 218 with the slidable frame 210.

The housing 202 may include a flange. The flange restrains the movement of the slidable frame 210 when the stud 212 is fitted or locked inside the groove 214. In an example implementation, the flange may be one of a first flange 222-1 and a second flange 222-2, shown in FIGS. 2a and 2b. Although two flanges are shown in FIGS. 2a and 2b, the housing 202 may have a single flange. The electronic card 208, when pushed in the housing 202 thereby moving the slidable frame 210 to lock the stud 212 in the groove 214 and compressing the spring 218, the flanges 222-1 and 222-2 stop the slidable frame 210 from moving further in the housing 202. Thus, the flanges 222-1 and 222-2 prevent over compression of the spring 218 and reduce the chances of damaging the spring 218.

As shown in FIGS. 2a and 2b, the housing 202 has projections 224-1 and 224-2 towards an end near the slot 204. The projections 224-1 and 224-2 are extensions of the housing 202 in the cavity enclosed by the housing 202. These projections 224-1 and 224-2 may restrain movement of the slidable frame 210 out of the housing 202. The distance, depicted as 'd' in FIG. 2b, between the projections 224-1 and 224-2 may correspond to a length of the slot 204 and may be equal to or greater than a width of the electronic card 206.

The description hereinafter elaborates the operation of the card holder 200 when the electronic card 206 is pushed in the housing 202, in a direction indicated by arrow A in FIG. 2a. As the card 206 is pushed through the slot 284 inside the cavity of the housing 202, the slidable frame 210 interfaces with edges of the card 206. The card 206 is thus held by the slidable frame 210 which moves along with the card 206 in the direction as indicated by arrow A. In response to movement of the slidable frame 210 in the direction of arrow A, the spring 218 gradually compresses and the stud 212 click fits inside the groove 214 which moves the push button 216 outwards in a direction, as indicated by arrow D. The stud 212 fitted or locked inside the groove 214, as shown in FIG. 2b, prevents further movement of the slidable frame 210 and thereby locks the card 206 in the housing 202. When the stud 212 is locked in the groove 214 with the card 206 in the housing 202, a distance, depicted as 'x' in FIG. 2b, between the slot 204 and the base member 210-1 of the slidable frame 210 is one of equal to and greater than a length of the card 206. Thus, when locked in the housing 202, as shown in FIG. 2b, the card 206 does not overhang from the housing 202.

To remove the card 206 from the card holder 200, the push button 216 may be actuated when pressed in a direction as indicated by arrow B in FIG. 2b. As the push button 216 is pressed, the stud 212 is deflected out of the groove 214 and the spring 218 begins to relax. As the spring 218 relaxes, the slidable frame 210 moves towards the slot 204, in a direction indicated by arrow C in FIG. 2b, so that the card 206 is popped out from the housing 202. When the card 206 is popped out from the housing 202, the card 206 may partly overhang outside the housing 202 for being gripped and removed from the card holder 200.

In an example implementation, the card holder 200 is for an electronic device, such as a laptop, a desktop, or any other card reader device. The card holder 200 may also be included in the electronic device. For example, the card holder 200 may be integral to the electronic device or may be coupled to the frame or chassis of the electronic device. The electronic device may include a card reader positioned to electrically couple with the electronic card 206 when the electronic card 206 is in the housing 202. When the card 206 is locked in the housing 202, as shown in FIG. 2b, the card reader (not shown) may couple with the connector 208 of the card 206.

Although implementations for electronic card holders are described in language specific to methods and/or structural features, it is to be understood that the present subject matter is not limited to the specific methods or features described. Rather, the methods and specific features are disclosed and explained as example implementations for electronic card holders.

We claim:

1. An electronic card holder comprising:
   a housing having a slot to receive an electronic card;
   a slidable frame in the housing to hold the electronic card, the slidable frame having a stud fittable in a groove in the housing the slidable frame comprising:
      a base member positioned along a length of slot; and
      two side arms, each at an end of the base member and perpendicular to the base, wherein the slidable frame is to hold the electronic card on the base member between the two side arms;
   a resilient element, one end of the resilient element being coupled to the housing and another end of the resilient element being coupled to the slidable frame; and
   an actuating member coupled to the groove, wherein,
      when the electronic card is pushed inside the housing, the slidable frame is moved to lock the stud inside the groove and compress the resilient element,
      when the stud is locked inside the groove, a distance between the slot and the base member of the slidable frame is one of equal to and greater than a length of electronic card, and
      when the actuating member is depressed, the stud is released from the groove and the resilient element is relaxed to move the slidable frame such that the electronic card is pushed out of the housing.

2. The electronic card holder as claimed in claim 1, wherein the housing comprises:
   a flange to restrain movement of the slidable frame when the stud is locked inside the groove.

3. The electronic card holder as claimed in claim 1, wherein the base member has a connecting rod passing through the another end of the resilient element.

4. The electronic card holder as claimed in claim 1, wherein the stud is positioned on one of the two side arms.

5. A card holder for an electronic device, comprising:
   a housing having a slot to receive an electronic card;
   a slidable frame in the housing to hold the electronic card the slidable frame comprising:
      a base member positioned along a length of slot; and
      two side arms, each at an end of the base member and perpendicular to the base, wherein the slidable frame is to hold the electronic card on the base member between the two side arms;
   a groove in the housing to receive a stud placed on the slidable frame;
   a push button coupled to the groove; and
   a spring with one end coupled to the housing and another end coupled to the slidable frame, wherein,
      while the electronic card is pushed inside the housing, the slidable frame is interfaced with edges of the electronic card and is moved to click fit the stud inside the groove and compress the spring,
      when the stud is fitted inside the groove, a distance between the slot and the base member of the slidable frame is one of equal to and greater than a length of the electronic card, and
      upon depression of the push button, the stud is deflected out of the groove and the spring is relaxed to move the slidable frame so as to pop out the electronic card from the housing.

6. The card holder as claimed in claim 5, wherein the housing comprises:
   a flange to restrain movement of the slidable frame when the stud is click fitted inside the groove.

7. The card holder as claimed in claim 5, wherein the base member has a connecting rod passing through the another end of the spring.

8. The card holder as claimed in claim 5, wherein the stud is positioned on one of the two side arms.

9. An electronic device comprising:
   a card holder including:
      a housing having a slot to guide an electronic card to a cavity inside the housing;
      a slidable frame positioned in the cavity to hold the electronic card, the slidable frame comprising:
         a base member positioned along a length of the slot; and
         two side arms, each at an end of the base member and perpendicular to the base, wherein the slidable frame is to hold the electronic card on the base member between the two side arms;
      a groove in the housing to receive a stud placed on the slidable frame;
      a spring coupled to the slidable frame and the housing; and
      a push button coupled to the groove,
      wherein,
         the slidable frame moves to fit the stud in the groove, compress the spring and lock the electronic card in the housing in response to a push to the electronic card inside the cavity,
         when the stud is fitted inside the groove, a distance between the slot and the base member of the slidable frame is one of equal to and greater than a length of the electronic card, and
         the stud releases from the groove and the spring relaxes to move the slidable frame so as to pop out the electronic card from the housing in response to depression of the push button.

10. The electronic device as claimed in claim 9, wherein the housing comprises:
 a flange to restrain movement of the slidable frame when the stud is fitted inside the groove.

* * * * *